May 3, 1932.  F. E. LEWIS  1,856,876
GARAGE ELEVATOR
Filed Oct. 11, 1929   3 Sheets-Sheet 2

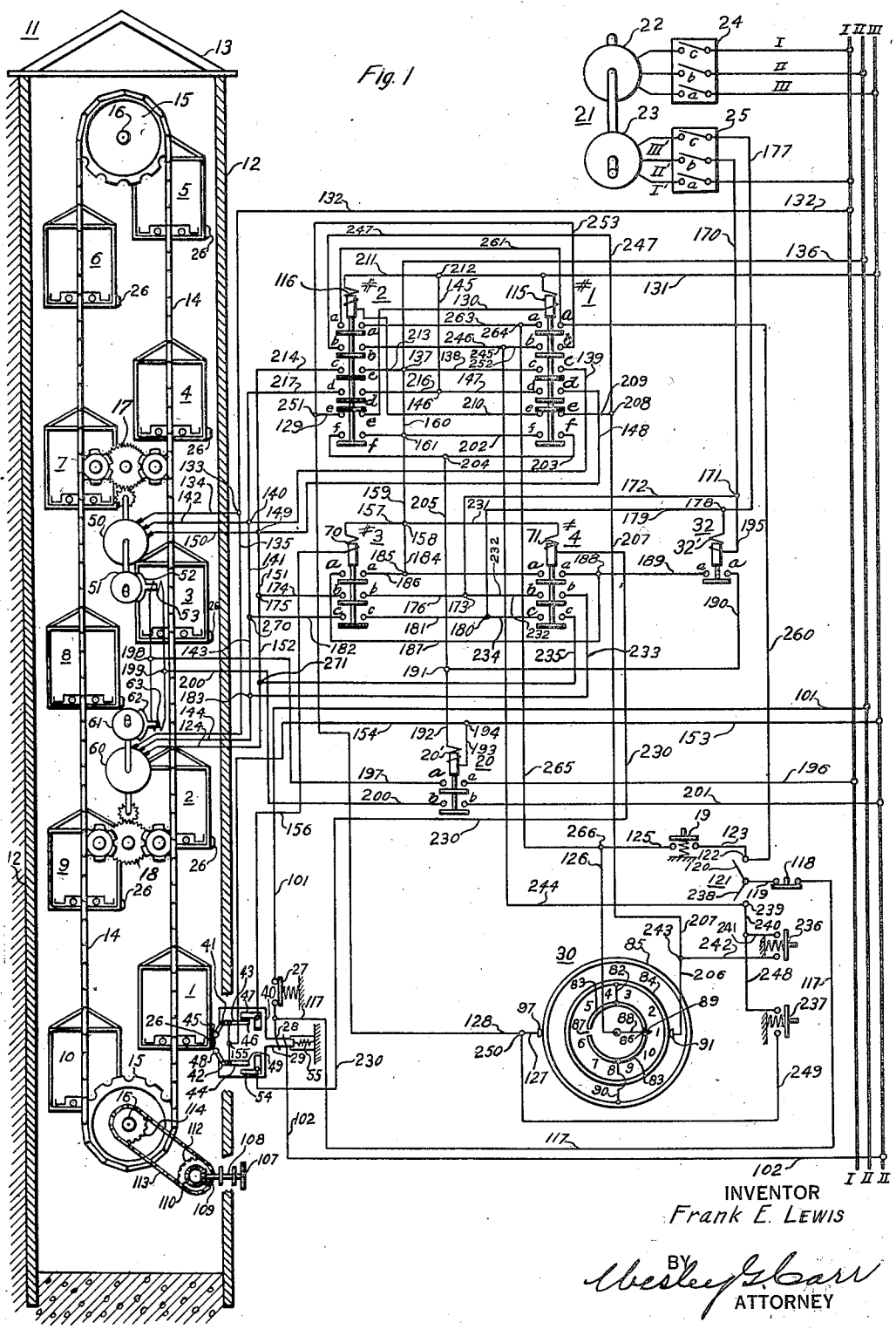

INVENTOR
Frank E. Lewis
ATTORNEY

May 3, 1932.  F. E. LEWIS  1,856,876
GARAGE ELEVATOR
Filed Oct. 11, 1929   3 Sheets-Sheet 3
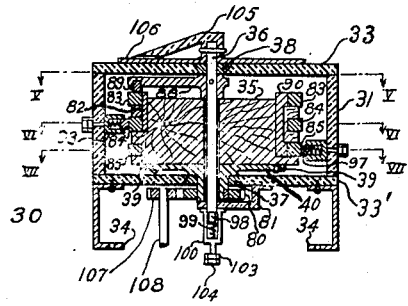
INVENTOR
Frank E. Lewis
BY
ATTORNEY Patented May 3, 1932

1,856,876

UNITED STATES PATENT OFFICE

FRANK E. LEWIS, OF EAST PITTSBURGH, PENNSYLVANIA, ASSIGNOR TO WESTINGHOUSE ELECTRIC & MANUFACTURING COMPANY, A CORPORATION OF PENNSYLVANIA

GARAGE ELEVATOR

Application filed October 11, 1929. Serial No. 398,898.

My invention relates to storage elevators of the conveyor type, particularly to control systems for such elevators, and more particularly to a control system for such elevators in which the direction of movement of a conveyor system is automatically controlled to bring a selected receptacle or elevator cage to a certain level by the shortest route.

In various applications of the conveyor-type elevator in which there is movement of the elevator in both clockwise and counter-clockwise directions, as, for example, in automobile-storage-elevator applications, it has previously been necessary for an operator to determine the proper direction of movement of the conveyor system, in order to bring a selected elevator cage to a loading or unloading level by the shortest route, and then to so operate the control means that the driving motors of the conveyor system shall accomplish this result.

In various types of automobile storage elevators of this character, in which it is necessary for an operator to determine the direction of movement of the conveyor system, prior to energization of the driving motors, a suitable device for indicating the positions of the various elevator cages is necessary. However, even when a cage-position-indicating device is employed, it is clear that, since a human element is involved, the proper direction for the travel to the loading or to the unloading level by the shortest route may not always be selected, that is, the operator may become confused, or may not understand the indication given by the indicating device, and, therefore, may actuate the control means to cause the conveyor system to move in the wrong direction, thus causing the selected cage to travel toward the loading and unloading level by the longest route.

In an automobile-storage elevator, a delay of even a few minutes, due to the additional time required for the selected elevator cage to travel by the longest route instead of by the shortest route to the loading or unloading level, would cause considerable annoyance, and inconvenience to a driver of an automobile who should be desirous of either parking his automobile or securing an automobile previously parked.

In any case, the distinct advantage accruing from a service, as well as from a commercial standpoint, of having a previously stored automobile brought to the unloading level in the shortest possible time is clearly obvious, and, therefore, the advantage accruing from a service, as well as from a commercial standpoint, of insuring that the shortest route will always be taken, so that the shortest time will be required to bring a previously stored automobile to an unloading level, is also clearly obvious.

One object of my invention is to obviate the necessity of having a human element involved in the operation of control systems for conveyor-type elevators for various applications, for example, automobile-storage elevators.

Another object of my invention is to construct a conveyor elevator system that will automatically move in the proper direction to ensure movement of a selected cage, by the shortest route, to a loading or unloading level.

Another object of my invention is to construct a conveyor elevator system that will, upon actuation of the control system, automatically move in the proper direction to cause a selected cage to travel to a certain level by the shortest route and, upon reaching that level, automatically stop.

A more specific object of my invention is to construct a control switch which will effect the automatic assumption of the proper direction of movement of the conveyor system, so that a selected cage will travel by the shortest route to a certain level and automatically stop at that level.

A still further object of my invention is to construct a conveyor-elevator system which may be operated either automatically, that is, in such a manner that a selected elevator cage automatically assumes the proper direction of travel to a certain level by the shortest route and automatically stops thereat, or manually.

My invention is described with reference to the accompanying drawings wherein,

Figure 1 is a diagrammatic sketch of a conveyor-type elevator used for automobile storage and the control system therefor which I propose to use associated therewith.

Fig. 4 is a vertical sectional view of the dial selector switch through the center line of the switch.

Fig. 5 is a sectional view on line V—V of Fig. 4, with a part of a plan view of the switch shown.

Fig. 6 is a sectional view on line VI—VI of Fig. 4.

Fig. 7 is a sectional view on line VII—VII of Fig. 4.

Fig. 8 is an enlarged sectional view showing the construction of one of the brushes shown in Figs. 5, 6, 7, and the means of so fastening it to the outside casing of the switch as to constitute a terminal connector for wires of the control circuit.

Fig. 9 is a diagrammatic representation of the position of the elements of the dial selector switch for a certain position of the conveyor system.

Figure 3:
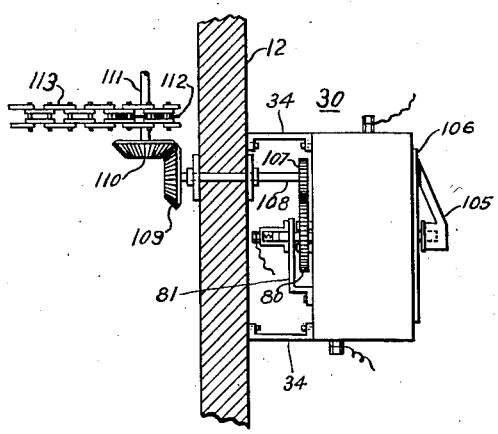
Fig. 3 is an enlarged view showing the arrangement whereby the rotational movement of the conveyor system is transmitted to the dial selector switch.

Referring to Fig. 1, a suitable housing structure 11 for the conveyor elevator system is shown as comprising side walls 12 and a roof structure 13. The housing structure may be built of standard structural steel materials and may or may not be totally enclosed by wood, brick or other building materials.

The conveyor elevator system itself comprises a plurality of cages of any number, although, in Fig. 1, I have shown but ten cages correspondingly numbered and suitably supported by a trunnion bar (not shown in detail) from two endless chains 14, spaced in a substantially parallel relation to each other.

The endless chains 14 are supported by, and move around, sheaves or sprocket wheels 15 at the top and bottom of the housing structure, which are rotatably mounted on shafts 16. The shafts 16 are supported, in suitable bearings (not shown), by the building structure 11. All the cages in the conveyor elevator system move simultaneously through the building structure by movement of the endless chains from which they are supported, past a loading and unloading platform X at the bottom of the housing structure 11. (See Fig. 2).

Each cage is provided with a low platform on casters or a truck capable of moving in any direction. In loading an object, for example an automobile, upon the cages, the automobile is first driven upon the platform which has been moved out into the loading and unloading platform or the object is, in some way, moved thereon, and the platform is then moved sidewise back into the elevator cake aligned with the loading and unloading platform. Movement of the platform or truck is accomplished manually or by some mechanical means or moved by electric motors operable from an outside source through flexible conductors or by a storage battery located on the truck itself. I have not shown a moving means for this platform or truck but it is understood that any of the above mentioned means of effecting movement are adaptable thereto. The endless chains 14 are driven by gear mechanism 17 and 18, which are, in turn, driven by electric motors 50 and 60.

The driving gear mechanisms which engage the endless chains and cause movement of the conveyor system are of any suitable construction, as, for example, those shown in Figs. 8, 9 and 10 of the pending application of H. D. James, Serial No. 265,011, filed March 27, 1928, and assigned to the Westinghouse Electric and Manufacturing Company.

I have shown only two driving mechanisms but, obviously, any number of gear mechanisms for engaging the endless chains to cause movement thereof may be employed, depending upon the number required, which varies with building structures of different heights. The driving motors for any number of driving gear mechanisms may all be operated in parallel in the same manner as are the two driving motors 50 and 60 shown in Fig. 1 as of a three-phase alternating-current type. In the control system which I propose to utilize, the driving motors 50 and 60 are actuated for normal speed of movement of the conveyor system from the three-phase high-frequency lines I, II, and III, through the direction relays #1 and #2; and, for a slow speed lower than the normal speed of movement of the conveyor system, the motors 50 and 60 are actuated from the three-phase low-frequency lines I', II', and III', through the direction relays #3 and #4.

I have used the terms "high" and "low" as applied to frequency, advisedly, to denote relative values of the frequencies from the two sources of supply rather than a particularly high or a particularly low value of frequency.

It should be understood that frequencies within the range of standard practice are intended to be included in the scope of the terms "high" and "low".

The high-frequency energy is supplied to the motors 50 and 60 from the supply lines I, II and III and the low-frequency energy is supplied from the lines I', II' and III' of a generator 23 of a standard motor-generator set 21 which is driven by a motor 22 energized from the high-frequency lines I, II and III.

Suitable circuit-closing and circuit-opening switches 24 and 25, of standard construction, are included in the lines to the motor 22 and in the supply lines I', II' and III', respectively and are either manually or electrically operated.

The actuation of direction relays #1 and #2 is controlled by the operation of a dial selector switch 30 and the starting push-button switch 19. The actuation of direction relays #3 and #4 is controlled by the operation of a levelling device 40.

At a convenient place, accessible for easy manipulation by a person on the loading and unloading platform X, is suitably mounted the dial selector switch 30 which is a dial combination of a selector switch, the selector portion of the switch being similar to that used in various types of selector switches of elevator installations.

The dial selector switch is used to select a particular cage or receptacle which it is desired to bring to the loading and unloading level, and it automatically so effects a set-up of the control circuit for the motors 50 and 60 driving the conveyor system, that, upon closing the starting switch 19, the conveyor system automatically moves in the proper direction to cause the cage selected to travel by the shortest route to the loading and unloading platform X at the bottom of the housing structure 11.

This dial selector switch 30 comprises an outer cylindrical supporting base 31 made of some insulating material, such, for example, as wood, fiber, or some phenolic condensation product, closed at one end by the disc-like member 33 made of the same or similar material and closed at the other end by a similar disc-like member 33', made of a similar insulating material. (See Fig. 4.) For purposes of mounting the dial selector, brackets 34 are provided.

A drum 35, made of wood, fiber, some phenolic condensation product or some other insulating material, is rotatably mounted inside the cylindrical supporting base 31 on the shaft or axle 36 which is rotatably supported and retained on one end by the metal bushing 38 fixed in the member 33, and, on the other end, being supported indirectly by the metal collar or bushing 37 fixed in the member 33'. Attached to one end of the drum 35 by screws 39, is a metal flanged disc-like plate 40, the flanged portion of which extends through the metal collar or bushing 37, to the outside of the cylindrical supporting base and which has a gear wheel 80 non-rotatably fastened to it, as, for example, by a press fit or a key and keyway. Fastened to the end member 33', is a Z-shaped bracket member 81 which serves as a further support for the end of the shaft 36.

Mounted on the drum 35, in parallel spaced relation to each other, are three commutator or collector rings 83, 84, and 85. (See Fig. 4.) The commutator ring 83 is composed of two semi-circular conducting segments or members so alined as to constitute a single commutator ring having two insulating portions or segments 86 and 87 between them. (See Fig. 5.) Fixed to the shaft 36, is an arm 88 which has a brush 89 suitably mounted thereon to make contact with one side of the commutator ring 83. The commutator ring 84, adjacent to the ring 83, is an unbroken ring, as shown in Fig. 6, and is connected to one segment of the commutator ring 83 by the conducting member 82 which extends from a point on the inside edge of the ring 84 to a point on the inside edge of the segment of the ring 83 to which it is connected. Adjacent to the commutator ring 84, is a similar commutator ring 85 which, like ring 84, resembles a washer in that it is unbroken in its circular periphery (see Fig. 7). The commutator ring 85 is connected to the second segment of the commutator 83, that is, to the segment of the ring 83 to which the ring 84 is not connected, by a conductor member 90 which connects points on the inside edge of the ring 85 and the segment of the ring 83 to which it is connected.

Engaging the commutator ring 84 is a brush 91 which is held in resilient engagement with the ring 84 by a spring 92 within the brush-holding member 93, made of conducting material. Extending through the wall of the cylindrical casing 31 (see Fig. 8) is a bolt-like portion 94 of the brush-holding member 93 which serves, in conjunction with a nut 95, to retain the member in a fixed position on the casing. A nut 96 serves to fasten an electrical conductor to the brush-holding member. A brush 97, similar to the brush 91, engages the commutator ring 85 and may be retained in position and connected to a conductor by means like or similar to that already described as utilized in connection with the brush 91.

A third brush 98 is retained in resilient engagement with the end of the conducting shaft 36 by a spring 99 held within a brush-holding member 100, which is mounted, by means of suitable bolts or screws, upon the member 81. A suitable bolt-like portion on the end of the brush-holding member 100 has two nuts 103 and 104 for attaching an electrical conductor thereto. The brush-holding device 100 serves as a terminal connection for the brush 89 which engages the segments of the commutator ring 83 since there is a continuous conducting path from one of the segments of the ring 83, through the contacting brush 89 on arm 88, the conducting arm 88, the shaft 36, the brush 98 and the brush holder 100, to the terminal point determined by nuts 103 and 104.

On the end of the shaft 36, opposite to the brush 98, is an indicating arm 105 fixedly mounted thereon, in alignment with the arm 88. On the outside face of the enclosing disc-like member 32 is a disc-like plate 106 which has identifying characters thereon corresponding to the respective elevator cages in the conveyor system. The indicating arm 105 may be so rotated as to be aligned with any of the characters on the dial plate 106.

The drum 35 is rotated synchronously in accordance with the movement of the conveyor system by a system of connecting gears and a chain drive. (See Fig. 3.) A gear 107, keyed to shaft 108, engages the gear 80, which, it will be remembered, is fixed with respect to the drum 35 (see Fig. 4). On the other end of the shaft 108 is keyed a bevel gear 109 which engages another bevel gear 110, keyed to a shaft 111, which is suitably mounted in the hatchway substantially at right angles to the shaft 108. Also keyed on the shaft 111 is a sprocket wheel 112. An endless flexible connecting member, preferably a chain 113, passes around the sprocket wheel 112 and a sprocket wheel 114 keyed to the same shaft 16, at the lower end of the housing structure, as is the sprocket wheel 15, which supports the chain 14 of the conveyor system. (See Figs. 1 and 3.)

The operation of the dial selector switch, assuming the conveyor system to be stopped, is as follows:

The operator, or the person who desires to either park his automobile or to remove it from its parked position, sets the indicating member 105 in alignment with the proper character on the dial plate 106, corresponding to the particular elevator cage which he desires to bring to the loading and unloading level. Since the indicating arm 105 is fixed to the end of the shaft 36, rotation of the indicating member 105 causes rotation of the shaft 36 and rotation of the brush arm 88 which is keyed or suitably fastened to the shaft 36. Thus, depending upon the elevator cage it is desired to select and its position on the conveyor system, the brush 89 on the arm 88 is caused to engage either the one or the other segment of the commutator ring 83. If the brush 89 engages the segment of the commutator ring 83 which is connected to the commutator ring 84, a circuit is set up which, when completed by the closing of the starting switch 19, energizes the coil 116 of the direction relay #2. The actuation of the direction relay #2 closes the circuits (fully traced hereinafter) of the supply lines to the driving motors 50 and 60 from the high-frequency lines I, II and III in such manner that the conveyor system rotates in a clockwise direction. Thus, the segment of ring 83 connected to ring 84 may be termed the clockwise segment. The movement of the conveyor system is transmitted to the drum 35 of the dial selector switch 30 by the gear- and-chain drive mechanism previously described, and the drum 35 rotates until the brush 89 leaves the segment with which it has been in engagement, due to the fact that it engages the insulating segment 86 in the commutator ring 83 between the two conducting segments. The dial selector switch is so designed that the selected elevator cage will be substantially at the level of the loading and unloading platform at the time that the brush 89 leaves the segment of the commutator ring with which it has been in engagement.

If the position of the elevator cage which it is desired to bring to the level of the loading and unloading platform has been such that the setting of the indicating member 105 shall have caused the brush 89 to engage the segment of the commutator ring 83, which is connected to the commutator ring 85, a circuit will have been set up which, when closed by the operation of the starting switch 19, will have energized the coil 115 of the direction relay #1. The actuation of the direction relay #1 closes the circuits to the driving motors 50 and 60 from the high-frequency supply lines I, II and III in such manner that the conveyor system is caused to rotate in a counter-clockwise direction. The segment of ring 83 connected to ring 85 may, therefore, be termed the counter-clockwise segment.

Thus, it will be seen that, depending upon the position of a selected elevator cage which it is desired to bring to the level of the loading and unloading platform, the relation of the brush 89 and the commutator ring 83 is such as to set up a circuit for either clockwise or counter-clockwise rotation of the conveyor system.

At the loading and unloading platform X is located a leveling device 40. This leveling device is similar to devices heretofore employed in elevator installations which act in the nature of limit switches for the purpose of insuring the proper alignment of the floor of the elevator cage and the floor of the loading and unloading platform. In Fig.1, I have represented this mechanism for accomplishing the proper alignment of the floor of the elevator cage and the floor of the loading and unloading platform as comprising a supporting base structure upon which are pivotally mounted, at the points 41 and 42, lever arms 43 and 44, respectively. On one end of the lever arm 43 is a roller 45 and on the opposite end is an electrical contact 46 which is associated with another electrical contact 47 mounted fixedly on the supporting base. Similarly, the lever arm 44 has a roller 48 mounted on one of its ends, and an electrical contact 49 on its other end. Associated with the contact 49 is a contact 54 mounted fixedly on the supporting base, the same as the contact 47. Mounted in a suitable place at the bottom of each elevator cage, is a cam 26, trapezoidal in shape, for engaging the rollers 45 and 48 of the leveling device 40 when the latter is in an extended position.

The only time at which the leveling device 40 is in an extended position, that is, a position in which the rollers 45 and 48 are in a position to be engaged by the trapezoidal shaped cam 26 is when a switch 27 is opened.

The switch 27 is of a common type, and is mounted in the hatchway at the loading and unloading platform in such manner as to cooperate with a member on the gate closure of each elevator receptacle or cage. When the cage is at the level of the loading and unloading platform and the gate closure opened, this member on the gate closure extends itself to engage the switch 27 to open it. When the gate closure is closed, the switch is spring operated to close again. The construction and operation of this type of switch are so well known that it has not been deemed necessary to show the switch or the method of operation in detail.

It will be obvious, therefore, that the switch 27 is closed at all times when no gate closure on any of the elevator cages is open. The closing of the gate switch 27 energizes a solenoid coil 28 which surrounds a plunger-like member 29 attached to the base structure of the device 40 and causes the entire structure of that device to be so retracted from its extended position, against the force of the spring 55, that the rollers 45 and 48 are not in a position to be engaged by the trapezoidal cam 26 on any of the elevator cages. The circuit for the energizing of the coil 28 is from the high-frequency supply line II, through conductor 101, gate switch 27, solenoid coil 28 and conductor 102, to high-frequency supply line III.

The reason for the retraction of the leveling device 40 at all times other than when a selected cage has been brought to the loading and unloading platform to be stopped is to prevent the actuation of the limit switches comprising the contacts 46, 47, 49 and 54. The switch formed by the contacts 46 and 47 is included in the circuit of the energizing coil 70 of the direction relay #3, and the switch formed by contacts 49 and 54 is in series with the energizing coil 71 of the direction relay #4. Energization of the coil 70 of the direction relay #3 closes contacts b—b and c—c on the relay #3 which connects the low-frequency supply lines to the motors 50 and 60 in such manner that the conveyor system moves in a clockwise direction, but at a reduced speed, as compared with the speed when operating from the high-frequency lines. Energization of the coil 71 of the direction relay #4 closes contacts b—b and c—c of the direction relay #4 which connects the low-frequency supply lines to the motors 50 and 60 in such manner that the conveyor system moves through the housing structure in a counter-clockwise direction at a slow speed, the same in value as the speed obtained when the motors 50 and 60 are connected to the low-frequency supply lines by the direction relay #3.

The closing of either of these switches on the leveling device 40 causes the conveyor system to move at a reduced speed. Obviously, therefore, it is undesirable that these switches shall operate when successive cages pass the loading and unloading level. It will be seen, therefore, that it is necessary that the device 40 be so retracted that the cam 26 on each of the elevator cages cannot engage the rollers 45 and 48 to actuate these switches when it is desired to have the cages continue their movement through the housing structure.

The purpose of using the gate switch 27 should now be evident from the fact that, since it is normally closed when none of the gate closures on any of the elevator cages are open, the energizing circuit for the coil 28 is kept closed through the path previously traced, and the leveling device 40 is so retracted from an engageable position with respect to the cam 26 on each of the elevator cages that the conveyor system moves through the housing structure at the normal higher speed, due to the fact that the driving motors 50 and 60 are energized from the high-frequency supply lines I, II and III.

Ordinarily, the gate closure on any of the elevator cages is not opened unless the cage is at the level of the loading and unloading platform. Therefore, only at this time is it necessary for the leveling device 40 to be extended out into the hatchway to an engageable position with respect to the cam 26. When an elevator cage is at the loading and unloading level, and its gate closure is opened, the gate switch 27 is thereby opened, the coil 28 is deenergized and the leveling device 40 is moved to its extended position by the force of the spring 55.

Automatically-operated brakes, similar to those of any of the standard types employed in elevator installations, are provided for each of the motors 50 and 60. The brake for motor 50 comprises a drum 51 mounted on the shaft of the motor 50, and a brake shoe and associated mechanism 52 for operation by a solenoid coil 53. The brakes are spring operated to close, that is, to perform their braking function when the solenoid is deenergized.

Similarly, the brake for motor 60 comprises a brake drum 61 mounted on the shaft of motor 60, a brake shoe and associated mechanism 62 operated by a solenoid coil 63 which is connected in parallel with the solenoid coil 53 which actuates the brake for the motor 50.

The brake solenoid coils 53 and 63, operating in parallel, are energized from the high-frequency supply lines I and III, through contacts $a$—$a$ and $b$—$b$ of a brake relay 20. The coil 20' of the brake relay 20 is energized when any of the direction relays #1, #2, #3 and #4 is actuated to close the circuits of the supply lines to the motors 50 and 60. In this way, the brake coils for each of the motors 50 and 60 are energized to release the brakes the instant the supply lines to the motors are closed.

The operation of my invention may best be understood by assuming that it is desired to bring a particular elevator cage to the level of the loading and unloading platform X. Let us assume that it is desired to bring cage 8, shown in Fig. 1, to the level of the loading and unloading platform X at the bottom of the housing structure.

The operator or the person desiring to bring the particular cage to the level of the loading or unloading platform rotates the indicating arm 105 of the dial selector switch 30 until it is in alinement with the character 8 on the dial plate 106, corresponding to the particular cage selected. As hereinbefore described, movement of the indicating arm 105 actuates the brush arm 88, upon the extremity of which the brush 89 is suitably mounted. This setting of the indicator arm 105 causes the brush 89 to engage the segment of the commutator ring 83, which is connected to the commutator ring 85.

The operator then presses the push-button starting switch 19, which closes the energizing circuit through the coil 115 of the direction relay #1 as follows: from the high-frequency supply line II, through conductor 101, the gate switch 27, (it is assumed that this gate switch 27 is closed, that is, that the particular cage at the level of the loading and unloading platform, if there is any at that particular level, has its gate closure closed), conductor 117, the push-button stop switch 118, conductor 119, arm 120 of the change-over switch 121, contact terminal 122 of the changeover switch 121, conductor 123, push-button starting switch 19, conductor 125, conductor 126 and the selector switch 30, to the brush 89, through contact segment of the commutator ring 83, connector member 90, commutator ring 85, brush 97, conductor 127, conductor 128, conductor 129, contacts $e$—$e$ of the normally closed switch on the direction relay #2, conductor 130, coil 115 of the direction relay #1 and conductor 131, to the high-frequency supply line III. The energization of coil 115 actuates the relay #1 to close the normally open relay contacts $a$—$a$, $b$—$b$, $c$—$c$, $d$—$d$, $f$—$f$ and to open the normally closed contacts $e$—$e$.

The closing of the contacts $a$—$a$ of the direction relay #1 closes a shunting circuit around the push-button switch 19 and maintains the energizing circuit for coil 115 when push-button switch 19 is released by the operator. That is, the push-button switch 19 makes only a momentary contact to first energize coil 115 and the contacts $a$—$a$ of direction relay #1 subsequently maintain the energizing circuit through coil 115 as previously traced. Contacts $a$—$a$ of direction relay #2 perform the same function when relay #2 is closed.

The closing of the relay contacts $c$—$c$ and $d$—$d$ closes the circuit from the three-phase high-frequency supply lines I, II, III to the driving motors 50 and 60. This circuit is as follows: from the high-frequency supply line I, through conductor 132, to the point 133, thence separating to go by conductor 134 to the driving motor 50, and again from the point 133, through conductor 135, to the driving motor 60. The circuit for the second phase extends from the high-frequency line II, through conductor 136, to the point 137, conductor 138, contacts $c$—$c$ of the direction relay #1, conductor 139, to the point 140, thence, by conductor 142, to the driving motor 50. From the point 140, the circuit extends also, through conductors 141 and 143, to the point 183 and then, through conductor 144, to the driving motor 60. The third phase line extends from high-frequency supply line III, through conductors 131 and 145 to point 146, then, through conductor 147, contacts $d$—$d$ of the direction relay #1 and conductor 148, to the point 149, thence separating to go to the driving motor 50 by conductor 150 and to the driving motor 60 by conductors 151, 152 and 124.

The driving motors 50 and 60 are of the type that are capable of starting from rest by the impression of full line potential. Therefore, the closing of the contacts $c$—$c$ and $d$—$d$ of the direction relay #1 causes the driving motors 50 and 60 to rotate in such direction as to cause the conveyor system to move in a counterclockwise direction, assuming that the brakes for motors 50 and 60 have previously been released in a manner which will now be described.

The closing of the contacts $f$—$f$ of the direction relay #1 closes the energizing circuit through the coil 20' of the brake relay 20, this circuit being as follows: from the high-frequency supply line II, through conductors 136 and 160, to the point 161, thence, by conductor 202, contacts $f$—$f$ of the direction relay #1 and conductor 203, to the point 204, through conductor 205, to the point 191, then, through conductor 192, coil 20' of the brake relay 20 and conductor 193 to the point 194, and thence, through conductor 153, to the high-frequency supply line III.

The energization of the coil 20' closes the contacts $a$—$a$ and $b$—$b$ of the brake relay 20 which close the energizing circuit to the brake coils 53 and 63. The circuit is as follows: from high-frequency supply line I through conductor 196, contacts $a$—$a$ of the brake relay 20 and conductor 197 to the point 198, and thence, through the brake coils 53 and 63, in parallel, to the point 199, through conductor 200 and contacts $b$—$b$ of the brake relay 20, and thence, through conductor 201, to the high-frequency supply line III.

Figure 2:
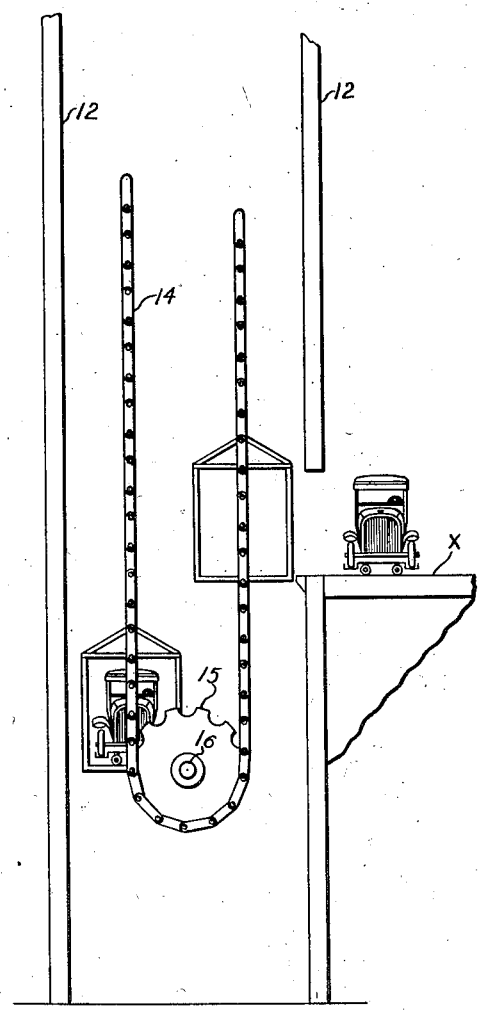
Fig. 2 is a diagrammatic sketch of the lower portion of the housing structure showing the loading and unloading platform and the method of loading the objects on the individual elevator cages.

The conveyor system continues to move at the normal speed of the motor, when actuated from the high-frequency supply line I, II and III, until the elevator cage 8 has descended to the bottom of the housing structure, passed around the lower sheave 15 and risen until it is at the level of the loading and unloading platform shown in Fig. 2, at which time, the segment of the commutator ring 83 on the drum 35 of the dial selector switch 30 has been turned by the movement of the conveyor system, in the manner hereinbefore explained, to such an extent that the brush 89 has left that segment and engaged the insulated portion 86 between the two conducting segments of the commutator ring 83, thus opening up the energizing circuit through the coil 115 of the direction relay #1 and causing the deenergization of the direction relay #1 so that the supply circuit to the driving motors 50 and 60 is opened up, due to the opening up of contacts $c$—$c$ and $d$—$d$ of the direction relay #1. The driving motors 50 and 60, therefore, stop their rotation, resulting in the stopping of the conveyor system, which means, therefore, that the selected elevator cage 8 has automatically stopped at substantially the level of the loading and unloading platform X, at the bottom of the housing structure.

When the coil 115 of the direction relay #1 is deenergized, the contacts $f$—$f$ open, resulting in the opening of the energizing circuit for the coil 20' of the brake relay 20. The deenergization of the coil 20' of the brake relay 20 opens the contacts $a$—$a$ and $b$—$b$ of this relay, thus opening the energizing circuit to the brake coils 53 and 63 which results in the setting of the brakes by the spring-operated mechanism associated therewith.

It is possible that the elevator cage would stop in such position that the floor of the cage would be at the exact level of the loading and unloading platforms. However, it is possible that the elevator cage 8 may stop in such position that the floor of the cage is either above or below the level of the loading and unloading platform X.

I have shown, in Fig. 2, in a general way, that the loading of the automobiles on the elevator cages is accomplished by the so-called "side-loading" method and have not indicated, in any detail, the exact method whereby this is accomplished. However, in any of the common methods used for this type of loading, it is necessary that the floor of the elevator cage shall have a definite relation to the loading and unloading platform level, so that the automobiles may be transferred from the loading and unloading platform to the elevator cage.

For example, if the automobile is driven upon a low truck or dolly, capable of being moved sidewise into the elevator cage from the loading and unloading platform, it will be seen that it is necessary for the floor of the elevator cage to be exactly level with the loading and unloading platform.

Assuming that the elevator cage 8 stopped a little above the level of the loading and unloading platform, obviously, some means is necessary to level the elevator cage, that is, to properly register the floor of the elevator cage and the loading and unloading platform. The method used in my invention is by an additional movement of the conveyor system which moves the cage an amount necessary to effect the desired adjustment.

In my invention, the adjustment is accomplished by means of the leveling device 40 shown in Fig. 1, which has been previously described. The operator at the loading and unloading platform, who has brought the elevator cage to its present position in substantial register with the loading and unloading platform and, in this case, it is assumed that it has stopped a little above the loading and unloading platform, opens the gate closure (not shown) on the elevator cage 8, which, in turn, opens the gate switch 27 located in the hatchway, in a manner which has previously been described. The opening of the switch 27 opens the energizing circuit for the solenoid coil 28, as previously traced. The spring 55 then forces the leveling device 40 out into the hatchway to its extended position. The cam 26 on the elevator cage 8 thus engages the roller 45 of the lever arm 43 and causes the lever arm to turn about the pivot point 41 in a counter-clockwise direction to close the switch formed by the cooperation of contacts 46 and 47. The closing of the switch, comprising contacts 46 and 47, closes the energizing circuit through the coil 70 of the direction relay #3, which circuit is as follows: from the high-frequency supply line III, through conductors 153 and 154, to the common point 155 of the conducting lever arms 43 and 44, thence, through lever arm 43, contact 46, contact 47, conductor 156, coil 70 of the direction relay #3 and conductor 157, to the point 158, thence, by conductor 159, to the point 161 and thence, by conductor 160, to the point 137, then, through conductor 136, to the high-frequency supply line II.

The energization of the coil 70 of the direction relay #3 closes contacts $a$—$a$, $b$—$b$ and $c$—$c$ of this relay. The closing of the contacts $a$—$a$ and $b$—$b$ of the direction relay #3 closes the circuit to the driving motor 50 and 60 from the low-frequency supply lines I', II' and III' of the generator 23. Assuming that the circuit switch 25 is closed, the circuit for each of the lines of the three-phase supply to the driving motors 50 and 60 is as follows: from the generator 23, the line I' is connected, through member a of the switch 25, to the high-frequency supply line I. The circuit then extends from the high-frequency line I, by the conductor 132 which is common to the high-frequency line I and the low-frequency line I', to the point 133, whence it separates, going to the driving motor 50 by conductor 134 and to the driving motor 60 by the conductor 135. The second phase line extends from the generator 23, through low-frequency supply II', a second member b of the switch 25 and conductor 170 to the point 171, through conductor 172, to the point 173, thence, through conductor 176 and contacts b—b of the direction relay #3 and conductor 174, to the point 175, whence it separates, going, by conductors 151 and 150, to the driving motor 50 and also from the point 175, by conductors 152 and 124, to the driving motor 60. The circuit for the third-phase line extends from the generator 23, through low-frequency supply line III', a third member c of the switch 25 and conductor 177, to the point 178, thence, by conductor 179, to the point 180, through conductor 181, contacts c—c of the direction relay #3 and conductor 182, to the point 270, whence it separates, going, by conductors 141 and 142, to the driving motor 50 and again, from the point 270, to the driving motor 60 through conductors 143 and 144.

It will be remembered that, when the driving motors 50 and 60 are at rest, the brakes previously described for each motor are set. As previously mentioned, the brakes must first be released before the driving motors 50 and 60 will start to rotate. This release of the brakes is accomplished, at this particular time and under the assumed conditions, by means of contacts a—a on the direction relay #3, which close when the direction relay #3 is energized. This effects the closing of the energizing circuit of the coil 20' of the brake relay 20. The circuit is as follows: from high-frequency supply line II, through conductors 136, 160, 159, 184, to the point 185, thence, by conductor 186, contacts a—a of the direction relay #3 and conductor 187, to the point 188, through conductor 189, contacts a—a, of the relay 32 and conductor 190, to the point 191, through conductor 192, relay coil 20' of the relay 20 and conductor 193, to the point 194, and thence, by conductor 153, to the high-frequency supply line III.

The relay 32 is an interlock relay which prevents the energization of the coil 20' of the brake relay 20 upon the closing of the direction relay #3 unless the proper potential is across the low-frequency supply lines I', II' and III'. The energizing circuit for the coil 32' of the relay 32 extends from low-frequency supply II' (and assuming the switch 25 to be closed) through member b of switch 25, and by conductor 170 to the point 171, thence, by conductor 195, through coil 32' of the relay 32, to the point 178, and thence, by conductor 177, to the low-frequency supply line III', through the member c of switch 25. It will be observed that this relay coil is continuously energized when the generator 23 is supplying the proper potential and the switch 25 is closed, and thus, under these conditions, the contacts a—a of the relay 32 are closed.

The energization of the coil 20' of the brake relay 20 closes contacts a—a and b—b of this relay which effects the energization of the coils 53 and 63 for the brakes of the driving motors 50 and 60, respectively. The circuit extends from high-frequency supply line I, conductor 196, contacts a—a of the brake relay 20 and conductor 197, to the point 198, thence, through the brake coils 53 and 63, in parallel, to the point 199, thence, through conductor 200, contacts b—b on the brake relay 20 and conductor 201 to the high-frequency supply line III. The energization of the brake coils 53 and 63 releases the brakes on the motors 50 and 60 at the same time that the circuit from the low-frequency supply lines I', II' and III' to the driving motors 50 and 60 is established, as heretofore described.

The driving motors 50 and 60 now rotate at a comparatively low speed in such direction that the conveyor system moves in a clockwise direction at a comparatively low speed, as determined by the frequency of the low-frequency supply generator 23. The conveyor system continues to move slowly in a clockwise direction until the cam 26 on the elevator cage 8 no longer engages the roller 45 of the leveling device 40 in such manner as to cause the contacts 46 and 47 to engage each other. When the contacts 46 and 47 separate, the energizing circuit for the coil 70 of the direction relay #3, which has previously been traced, is opened, and the coil 70 is thus deenergized, causing the contacts a—a, b—b, c—c of the direction relay #3 to open. The opening of contacts a—a and b—b opens the supply circuit from the low-frequency supply line I', II' and III' to the driving motors 50 and 60, as previously traced, and the conveyor system is thus stopped in such position that the floor of the elevator cage 8 is in exact register with the loading and unloading platform X.

It is possible that the elevator cage 8 may stop in such position that its floor will be a little below the level of the loading and unloading platform. In this case, the operation of the leveling device 40, assuming that the gate closure on the elevator cage 8 has previously been opened, will be as follows: the cam 26 on the elevator cage 8 engages the roller 48, causing the conducting lever arm 44 to rotate in a clockwise direction, causing the contact member 49 to engage the contact 54, thus closing the energizing circuit through the coil 71 of the direction relay #4, which circuit is as follows: from the high-frequency supply line III, through conductor 153 and 154, to the common point 155 connecting the conducting levers 43 and 44 on the leveling switch 40, thence, through the conducting lever 44, contacts 49 and 54, conductor 230, the coil 71 of the direction relay #4 and conductor 231, to the point 158, thence, by conductors 159, 160, and 136, to the high-frequency supply line II. The energization of the coil 71 closes the contacts of the direction relay #4 and the closing of the contacts b—b and c—c closes the circuit to the driving motors 50 and 60 from the low-frequency supply lines I', II' and III', in a similar manner to contacts b—b and c—c of the direction relay #3, two of the leads to the driving motors 50 and 60, however, being interchanged from the connection established by the operation of the contacts b—b and c—c of the direction relay #3, so that the driving motors 50 and 60 rotate in the opposite direction from their direction of rotation caused by the operation of the direction relay #3. The circuit of the supply lines to the driving motors 50 and 60 closed by the closing of the contacts on the direction relay #4 is as follows: from the low-frequency supply line I' to the driving motors 50 and 60, the circuit is the same as for that traced for direction relay #3. From the low-frequency supply line II', the circuit extends through member b of the switch 25, conductors 170 and 172 to the point 173, thence, by conductor 232, contacts b—b of the direction relay #4 and conductor 233, to the point 183, whence it separates, going by conductors 143, 141, and 142 to the driving motor 50 and again from the point 183, by conductor 144, to the driving motor 60. The circuit from low-frequency supply line III' extends through the member c of the switch 25 and conductors 177 and 179, to the point 180, thence, by conductor 234, contacts c—c of the direction relay #4 and conductor 235, to the point 271, thence separating, going to the driving motor 50 by conductors 152, 151 and 150 and to the driving motor 60 by the conductor 124.

The driving motors 50 and 60 now rotate in such direction as to cause the conveyor system to move through the housing structure in a counter-clockwise direction at a low speed which is determined by the low-frequency potential supplied by the generator 23, assuming that the brakes set on the driving motors 50 and 60 have been previously released by the closing of the energizing circuit through the coil 20' of the brake relay 20, through the contacts a—a of the direction relay #4, in a manner similar to, and with substantially the same circuit as traced for, contacts a—a of the direction relay #3 except that contacts a—a of direction relay #4 are substituted for contacts a—a of direction relay #3.

The elevator cage 8 thus is moved slowly upward until the cam 26 on the elevator cage 8 no longer engages the roller 48 in such manner as to cause contact 49 on the conducting lever arm 44 of the leveling device 40 to engage its associated contact 54. At this time, the energizing circuit through coil 71 of the direction relay #4, as previously traced, is opened thus opening the contacts b—b and c—c resulting in the opening of the supply circuit to the driving motors 50 and 60 and in the opening of contacts a—a to effect deenergization of the coil 20' of the brake relay 20. The conveyor system is thus stopped in such position that the floor of the elevator cage 8 is in exact register with the level of the loading and unloading platfrom, and the brakes are reset on the driving motors 50 and 60.

The automobile which has been previously driven upon the low truck or dolly, as previously mentioned, is now moved sidewise, either manually or by some mechanical means, into the elevator cage 8, the gate closure on the cage 8 is closed and the conveyor system is ready to function in response to a subsequent call.

A person who subsequently desires to secure another particular cage, either for the purpose of loading an automobile thereon or unloading an automobile therefrom, similarly to the person who selected the elevator cage 8 first, sets the indicating arm 105 on the dial selector switch 30 in alinement with the character on the dial plate 106, corresponding to the particular cage he has selected, and then pushes the starting push-button 19 to a closed position. The cage he selects is then brought to the loading and unloading level in a manner previously described for the elevator cage 8.

Let it be assumed that a person desires to bring the elevator cage 10, shown in Fig. 1, to the loading and unloading platform, when the elevator cage 8 is standing thereat. It should be understood that the insulating segment 86 between the conducting segments of the commutator ring 83 is, under these conditions, now in alinement with the character 8 on the dial face 106, so that, instead of the dial selector switch appearing as it is represented to be, in Fig. 1, it will appear as represented in Fig. 9, after the indicating arm 105 has been set in alinement with the character 10 on the dial plate 106. Thus, since the brush arm 88 and the indicator arm 105 are in alinement with each other, it will be understood that the brush 89 is now in engagement with the segment of the commutator ring 83 which is connected to the commutator ring 84, that is the clockwise segment of ring 83.

The person then pushes the push-button starting switch 19 which closes the energizing circuit through the coil 116 of the direction relay #2, which circuit is as follows: from the high-frequency supply line II, through conductor 101, the gate switch 27, conductor 117, stop switch 118, conductor 119, member 120 of the changeover switch 121, terminal 122 of the changeover switch 121, conductor 123, the push-button starting switch 19, conductors 125 and 126 and the selector switch 30, to the brush 89, through the brush 89, the clockwise segment of the commutator ring 83, the connecting member 82, connecting the clockwise segment of ring 83 to the commutator ring 84, the commutator ring 84, the brush 91 and conductors 206 and 207, to the point 208, thence, by conductor 209 and normally closed contacts e—e of the direction relay #1 and conductor 210, through the coil 116 of the direction relay #2, and conductor 211, to the point 212, and thence, by conductor 131, to the high-frequency supply line III.

As previously mentioned, the closing of the contacts a—a of the direction relay #2 shunts the push-button starting switch 19, so that the energizing circuit for the coil 116 of the direction relay #2 is maintained through the contacts a—a when the push-button switch 19 is released, this shunting circuit being from terminal 122 of the changeover switch 121 which is connected by the conductor 123, to one side of the push-button switch 19, through conductor 260, to one of the contact members a—a of the direction relay #1, thence, by conductor 261, contacts a—a of the direction relay #2 and conductor 263, to the point 264, thence, by conductor 265, to the point 266 which is connected to the other side of the push-button starting switch 19 by conductor 125.

The closing of the contacts c—c and d—d of the direction relay #2 closes the circuit to the driving motors 50 and 60 in a manner similar to the contacts c—c and d—d of the direction relay #1, except that they are so connected as to exchange two of the leads to the driving motors 50 and 60. The circuit of the phase line from high-frequency supply line I is the same as previously traced for the direction relay #1. The circuit for the second phase line from high-frequency line II is the same as traced for the direction relay #1 to the point 137, thence it goes, by conductor 213, contacts c—c of the direction relay #2 and conductor 214, to the point 149, whence it separates, going by conductor 150 to the driving motor 50 and by the conductors 151, 152 and 124 to the driving motor 60. The circuit for the third-phase line from high-frequency line III is the same as previously traced for direction relay #1 to the point 146, whence it goes, through conductor 216, contacts d—d of the direction relay #2 and conductor 217, to the point 140, whence it separates, going by conductor 142 to the driving motor 50, and, by conductors 141, 143 and 144, to the driving motor 60.

The closing of the contacts f—f of the direction relay #2 closes the energizing circuit through the coil 20' of the brake relay 20 in the same manner and by the same connections as contacts f—f of the direction relay #1, since these two contact switches are connected in parallel. As previously described for the contacts f—f of the direction relay #1, the brake coils 53 and 63 of the driving motors 50 and 60, respectively, are released, by the energization of brake relay 20.

The conveyor system now moves in a clockwise direction at the normal speed determined by the frequency of the high-frequency supply lines I, II and III. The cage 10 will descend until it reaches substantially the level of the loading and unloading platform X at the bottom of the housing structure, at which time, due to the rotation of the drum 35 of the dial selector switch 30, caused by the rotation of the conveyor system, as previously explained, the brush 89 leaves the segment, with which it has been engaged, and engages the insulating segment 86 of the commutator ring 83. Thus, the energizing circuit for the coil 116 of the direction relay #2 is opened, and the coil 116 is deenergized, whereby the direction relay #2 is opened. The opening of the contacts c—c and d—d opens the circuit to the driving motors 50 and 60 from the high-frequency supply lines I, II and III, and the conveyor system stops.

At the same time, also, the opening of the contacts f—f of this direction relay #2 opens the energizing circuit for the coil 20' of the brake relay 20, and the brake relay 20 opens, thereby opening the energizing circuit for the brake coils 53 and 63, as previously described for direction relay #1, and the brakes for the driving motors 50 and 60 are set by the operation of the spring mechanism.

Should the elevator cage 10 not stop in such position that its floor is in exact register with the loading and unloading platform at the bottom of the housing structure, leveling device 40 will operate to level cage 10 in the same manner as previously described for the elevator cage 8, if the gate closure on the elevator cage 10 is opened by someone.

The control system for the conveyor type elevator, as embodied in my invention, is so designed that, in addition to the operation and control of the conveyor system by the use of the dial selector switch 30, additional means has been provided whereby the selector switch 30 may be cut out of the circuit and the conveyor system moved in either direction or so that any cage may be brought to the loading and unloading platform optionally by either the longest or the shortest route. This additional means comprises the "clockwise" push-button 236 and the "counter-clockwise" push-button 237 which are suitably mounted adjacent to the dial selector switch for ready accessibility by any person on the loading and unloading platform.

In order to use the push-buttons 236 and 237, it is necessary for the operator to throw over the changeover switch 121 to its second position, namely, that position in which the member 238 engages the contact member 239. (See Fig. 1). This throwing-over of the changeover switch 121 cuts the dial selector switch 30 out of the circuit and permits operation of the conveyor system by push-buttons 236 and 237 only. This changeover switch 121 is suitably mounted near the dial selector switch 30 and the push-buttons 236 and 237. Thus, the use of the push-buttons 236 and 237 removes the "movement to the loading and unloading platform by the shortest route" element from the operation of the conveyor system. It removes also, the automatic stopping feature which the use of the dial selector switch 30 effects, in that, stopping of the conveyor system can only be accomplished in this case by pressing the stop push button 118. Obviously, however, the stop push button 118 can also be used to stop the conveyor system in any position, even when the dial selector switch 30 is used.

Let us assume that it is desired to move the conveyor system in a clockwise direction and stop it in another position. Having first thrown the changeover switch 121 so that the arm 238 engages terminal 239, the operator then pushes the clockwise push button 236, which closes the energizing circuit through the coil 116 of the direction relay #2. This circuit is the same as traced for the use of the dial selector switch 30 up to the changeover switch 121. The circuit then continues, through the conducting member 238 of the changeover switch 121, to the contact member 239 on the changeover switch 121, thence, by conductor 240, 241, push-button switch 236 and conductor 242, to the point 243, thence, by conductor 207, to the point 208, thence, through conductor 209, normally closed contacts e—e of the direction relay #1, conductor 210, coil 116 of the direction relay #2 and conductors 211 and 131, to the high-frequency supply line III. The energization of the coil 116 closes the contacts of the direction relay #2, resulting in the release of the brakes set on the driving motors 50 and 60 and the closing of the supply lines to those motors, resulting in the rotation of the motors and movement of the conveyor system in a clockwise direction. The closing of the contacts b—b of the direction relay #2 shunts the push-button switch 236 to effect a holding contact for maintaining the energization of the coil 116 of the direction relay #2 when the push-button switch 236 is released.

The shunting circuit extends from the terminal 239 of the changeover switch 121 which is connected to one side of push-button switch 236 by conductors 240 and 241, through conductor 244, to the point 245, thence, by conductor 246, through contacts b—b of the direction relay #2 and conductor 247, to the point 208 which is connected to the other side of push-button switch 236 through conductors 207 and 242.

In order to stop the conveyor system at the desired position, the operator pushes the stop push button 118. This opens the energizing circuit through the coil 116, as previously traced, which results in the stopping of the conveyor system and the resetting of the brakes.

The operation of the leveling device 40 is not affected by the fact that the dial selector switch 30 is not being used, since it is entirely independent of the dial selector switch 30 in its operation. Therefore, leveling by the use of the leveling device 40 is capable of being effected when the push buttons 236 and 237 are used in the same manner as described previously with dial selector switch 30 in use.

If it is desired to move the conveyor system in a counter-clockwise direction, the operator pushes the push-button switch 237, momentarily closing the energizing circuit through the coil 115 of the direction relay #1. The energizing circuit is the same as for the use of the dial selector switch 30 up to the changeover switch 121. The circuit then extends, through contact members 238 and 239 of the changeover switch 121, conductors 240 and 248, the push-button switch 237 and conductor 249, to the point 250, thence, by conductor 128, to the point 251, thence, through conductor 129, contacts e—e of the direction relay #2, conductor 130, coil 115 of the direction relay #1 and conductor 131, to the high-frequency supply line III.

In a manner similar to that when the dial selector switch 30 is used, the contacts on the direction relay #1 close to release the brakes set on the driving motors 50 and 60 and to close the circuits of the lines to the driving motors 50 and 60, thus causing their rotation and movement of the conveyor system in a counter-clockwise direction.

The closing of the contacts b—b of the direction relay #1 forms a shunting circuit around the push-button switch 237, thus serving to maintain the energizing circuit through the coil 115 of the direction relay #1, when push button 237 is released. The circuit for the shunting contact b—b extends from the point 245, which is connected to one side of push-button switch 237 by conductors 244, 240 and 248, through conductor 252, contacts b—b of the direction relay #1 and conductor 253, to the point 251 which is connected to the other side of push-button switch 237 by conductors 128 and 249.

The conveyor system continues to move in a counter-clockwise direction until manually stopped by the operator pressing the push-button stop switch 118.

It will thus be seen that I have disclosed a conveyor-type elevator having a control system in which the direction of movement of the elevator cages is automatically assumed so that the cages travel to a loading and unloading platform by the shortest route and also having the additional provision for manual starting and manual stopping. It will also be seen that I have disclosed a switching device for accomplishing the automatic "shortest route" selection.

It will be understood that I have described my invention by figures and terms intended to be illustrative only and do not intend it to be limited to the exact structure shown.

I claim as my invention:

1. In a conveyor system, the combination with means defining a circuitous path past a station, a plurality of load receptacles, motive means for moving said load receptacles in said circuitous path, of control means operable to select any one of said receptacles and for causing said motive means to move said selected receptacle to said station, and including means for automatically selecting the direction in which said selected receptacle must move to reach said station by the shortest route.

2. In a conveyor system, the combination with means defining a circuitous path past a station, a plurality of load receptacles, motive means for moving said load receptacles in said circuitous path, of a control system including a switch means operable to select any one of said receptacles and cause said motive means to move said selected receptacle to said station, said switch means comprising drum selector means operable synchronously with the movement of said receptacles for automatically selecting the direction in which said selected receptacle must move to reach said station by the shortest route.

3. In a conveyor system, the combination with means defining a circuitous path past a station, a plurality of load receptacles, motive means for moving said load receptacles in said circuitous path, of control means operable to select any one of said receptacles and for causing said motive means to move the selected receptacle to said station, and including means operable synchronously with the movement of said receptacles for automatically selecting the direction in which said selected receptacle must move to reach said station by the shortest route and for stopping said selected receptacle at said station in substantial register therewith.

4. In a conveyor system, the combination with means defining a circuitous path past a station, a plurality of load receptacles, motive means for moving said load receptacles in said circuitous path, of a control system including a switch means operable to select any one of said receptacles and cause said motive means to move said selected receptacle to said station, said switch means comprising drum selector means operable synchronously with the movement of said receptacles for automatically selecting the direction in which said selected receptacle must move to reach said station by the shortest route and for stopping said selected receptacle at said station in substantial register therewith.

5. In a conveyor system, the combination with means defining a circuitous path past a station, a plurality of load receptacles, motive means for moving said load receptacles in said circuitous path and control means for said motive means, of leveling means at the station, and means on each receptacle for effecting the operation of said leveling means to exactly register any of said receptacles with said station after the receptacle has stopped substantially at the level thereof.

6. In a conveyor system, the combination with means defining a circuitous path past a station, a plurality of load receptacles, motive means for moving said load receptacles in said circuitous path and control means for said motive means, of leveling means at the station, and means on each receptacle for effecting the operation of said leveling means to cause said motive means to move any of said receptacles into exact register with said station after the receptacle has stopped substantially at the level thereof.

7. In a conveyor system, the combination with means defining a circuitous path past a station, a plurality of load receptacles, motive means for moving said load receptacles in said circuitous path and control means for said motive means, of leveling means at the station, and means on each receptacle for effecting the operation of said leveling means to cause said motive means to move any of said receptacles into exact register with said station after the receptacle has stopped within a predetermined distance of said station.

8. In a conveyor system, the combination with means defining a circuitous path past a station, a plurality of load receptacles, motive means for moving said load receptacles in said circuitous path, and control means for said motive means, of cam means on each of said receptacles, leveling means at said station, said leveling means including switch means engageable by said cam means on each receptacle to cause said motive means to move any of said receptacles into exact register with said station after the receptacle has stopped substantially at the level thereof.

9. In a conveyor system, the combination with means defining a circuitous path past a station, a plurality of load receptacles, motive means for moving said load receptacles in said circuitous path, and control means for said motive means, of a gate closure on each of said receptacles, cam means on each of said receptacles, leveling means at said station, means for supporting the leveling means whereby it may be movable into extended and retracted positions, spring means for moving said leveling means into an extended position, said leveling means including switch means engageable by said cam means on each receptacle when said leveling means is in an extended position to cause said motive means to move that receptacle which has stopped within a predetermined distance of said station into exact register with said station, switch means at said station operable to open when the gate closure of the receptacle which is within a predetermined distance of the said station is opened, magnetically operable means actuable upon closing of said gate closure operated switch to move said leveling means into a retracted position in which the said switch means of said leveling means is non-engageable by said cam on each of said receptacles.

10. In a conveyor system, the combination with means defining a circuitous path past a station, a plurality of load receptacles, motive means for moving said load receptacles in said circuitous path, and control means for said motive means, of cam means on each of said receptacles, leveling means at said station, means for mounting said leveling means whereby it is movable into an extended and a retracted position, spring means operable to cause movement of said leveling means to the extended position, switch means on said leveling means engageable by said cam means of each receptacle when said leveling means is in an extended position to cause said motive means to move any of said receptacles into exact register with the said station after the receptacle has stopped substantially at the level thereof, magnetically operable means to move said leveling means into a retracted position in which the said switch means on said leveling means is not engageable by said cam means of said receptacles.

11. In a conveyor system, the combination with means defining a circuitous path past a station, a plurality of load receptacles, motive means for moving said load receptacles in said circuitous path, of control means operable to select any one of said receptacles and cause said motive means to move said selected receptacle to said station, and including means operable synchronously with the movement of said receptacles for automatically selecting the direction in which the said selected receptacle must move to reach said station by the shortest route, and additional control means for said motive means including switch means operable to cause said motive means to move any of said receptacles in said path in either direction and switch means operable to stop any receptacle in any position in said path.

12. In a conveyor system, the combination with means defining a circuitous path past a station, a plurality of load receptacles, motive means for moving said load receptacles in said circuitous path, of control means operable to select any one of said receptacles and cause said motive means to move said selected receptacle to said station, and including means operable synchronously with the movement of said receptacles for automatically selecting the direction in which the said selected receptacle must move to reach said station by the shortest route and stop said selected receptacle at said station in substantial register therewith, and additional control means for said motive means including a switch means operable to cause said motive means to move any of said receptacles in said path in either direction and switch means operable to stop any receptacle in any position in said path.

13. In a conveyor system, the combination with means defining a circuitous path past a station, a plurality of load receptacles, motive means for moving said load receptacles in said circuitous path, of control means operable to select any one of said receptacles and cause said motive means to move said selected receptacle to said station, and including means operable synchronously with the movement of said receptacles for automatically selecting the direction in which the said selected receptacle must move to reach said station by the shortest route and stop said selected receptacle at said station in substantial register therewith, and push button control means operable to cause said motive means to move any of said receptacles in said path in either direction and push button control means to stop it at any position therein.

14. In a conveyor system, the combination with means defining a circuitous path past a station, a plurality of load receptacles, motive means for moving said load receptacles in said circuitous path, of control means operable to select any one of said receptacles and cause said motive means to move said selected receptacle to said station, and including means operable synchronously with the movement of said receptacles for automatically selecting the direction in which said selected receptacle must move to reach said station by the shortest route, and additional control means for said motive means including a switch means operable to cause said motive means to move any of said receptacles in said path in either direction and switch means operable to cause said motive means to stop any receptacle in any position in said path, a changeover switch means for rendering said first mentioned control means operative only when said changeover switch means is in one position and for rendering said additional control means operative only when said changeover switch means is in a second position.

15. In a conveyor system, the combination with means defining a circuitous path past a station, a plurality of load receptacles, motive means for moving said load receptacles in said circuitous path, of control means operable to select any one of said receptacles and cause said motive means to move said selected receptacle to said station, and including means operable synchronously with the movement of said receptacles for automatically selecting the direction in which the said selected receptacle must move to reach said station by the shortest route and stop said selected receptacle at said station in substantial register therewith, and additional control means for said motive means including a switch means operable to cause said motive means to move any of said receptacles in said path in either direction and switch means operable to stop any receptacle in any position in said path, leveling means operable to cause said motive means to move any of said receptacles into exact alinement with said station after the receptacle has stopped substantially at the level thereof.

16. In a conveyor system, the combination with means defining a circuitous path past a station, a plurality of load receptacles, motive means for moving said load receptacles in said circuitous path, of control means for said motive means operable to cause said motive means to move said receptacles at a predetermined speed through said path, and leveling means operable after a receptacle has stopped upon engagement with the stopped receptacle to cause said motive means to move it at a speed below the predetermined speed until it is in exact register with the said station.

17. In a conveyor system, the combination with means defining a circuitous path past a station, a plurality of load receptacles, motive means for moving said load receptacles in said circuitous path, of a high frequency supply and a low frequency supply for said motive means, and control means for said motive means operable to cause actuation of said motive means from said high frequency supply whereby said receptacles move at a predetermined speed, and leveling means operable upon engagement with any of said receptacles to cause actuation of said motive means from said low frequency supply whereby the receptacles are moved at a speed below the predetermined speed until the receptacle in engagement with the said leveling means is in exact register with the said station.

18. In a conveyor system, the combination with means defining a circuitous path past a station, a plurality of load receptacles, motive means for moving said load receptacles in said circuitous path, and a control system for said motive means, of a control switch operable to select any one of said receptacles and to cause said motive means to move said selected receptacle to said station by the shortest route, said control switch including a rotatable drum operable by said load receptacles for synchronous movement therewith, two arcuate conducting segments separated by insulating segments and aligned to constitute a collector ring mounted on said drum, and a brush arm in rotatable engagement with said segments to establish a control circuit for said motive means to cause said motive means to move said receptacles in one direction when in engagement with one conducting segment and to move said load receptacles in the opposite direction when in engagement with the second conducting segment whereby the physical position of the selected receptacles automatically determines the direction of movement of the selected receptacle to travel to the said station by the shortest route.

19. In a conveyor system, the combination with means defining a circuitous path past a station, a plurality of load receptacles, motive means for moving said load receptacles in said circuitous path, and a control system for said motive means, of a control switch operable to select any one of said receptacles and to cause said motive means to move the selected receptacle to said station by the shortest route, said control switch including a rotatable drum operable by said load receptacles for synchronous movement therewith, two arcuate conducting segments separated by insulating segments and alined to constitute a collector ring mounted on said drum, and a brush arm in rotatable engagement with said segments to establish a control circuit for said motive means to cause said motive means to move said receptacles in one direction when in engagement with one conducting segment and to move said load receptacles in the opposite direction when in engagement with the second conducting segment whereby the physical position of the selected receptacle automatically determines the direction of movement of the selected receptacle to travel to the said station by the shortest route, manually operable means in fixed relation to said brush arm for varying the relative position of said brush arm and said segments on said drum member in accordance with the particular receptacle selected.

20. In a conveyor system, the combination with means defining a circuitous path past a station, a plurality of load receptacles, motive means for moving said load receptacles in said circuitous path, of control means operable to select any one of said receptacles and to cause said motive means to move said selected receptacle to said station, and including means operable synchronously with the movement of said receptacles for automatically selecting the direction in which said selected receptacle must move to reach said station by the shortest route and automatically stop the selected receptacle in substantial register therewith, braking means for said motive means cooperating with said control means, said braking means to be released when the said motive means is actuated and to be set on said motive means when said motive means is not actuated.

21. In a conveyor system, the combination with means defining a circuitous path past a station, a plurality of load receptacles, motive means for moving said load receptacles in said circuitous path, of control means operable to select any one of said receptacles and cause said motive means to move said selected receptacle to said station, and including means operable synchronously with the movement of said receptacles for automatically selecting the direction in which said selected receptacle must move to reach said station by the shortest route and cause the selected receptacle to stop thereat, leveling means for said receptacles including switch means at said station engageable by said receptacles for actuating said motive means to move said receptacles until said selected receptacle is in exact register with said station, braking means for said motive means and means cooperating with said control means and said leveling means to release said braking means from said motive means when said motive means are actuated and to set said braking means on said motive means when said motive means is not actuated.

22. In a conveyor system, the combination with means defining a circuitous path past a station, a plurality of load receptacles, motive means for moving said load receptacles in said circuitous path, of a source of high-frequency alternating current and control means for connecting the motive means with said high-frequency source for high-speed operation, brake means normally urged to engaging position to retard the motion of the conveyor and means energized from the high-frequency source simultaneously with the motive means for moving the brake to disengaging position, means energized from the source of high-frequency alternating current for generating alternating current of a lower frequency, control means for connecting said motive means to said low-frequency source for low-speed operation, an interlocking safety device which prevents the energization of the brake-releasing means from the high-frequency source unless low-frequency current of the proper potential is supplied for the motive means.

23. In a conveyor system, a plurality of load movers movable in an endless path successively past a station, means for selecting a particular one of said load movers and causing it to be moved to said station by the shortest route.

24. In a conveyor system, a plurality of load movers movable in an endless path successively past a station, means for selecting a particular one of said load movers and causing it to be automatically moved to said station by the shortest route and stopped thereat.

25. In a control system for a conveyor comprising a plurality of load supports movable in an endless path successively past a station, means for selecting a particular one of said supports and causing it to move automatically to said station by the shortest route.

26. In a control system for a conveyor comprising a plurality of load supports movable in an endless path successively past a station, means for selecting a particular one of said supports and causing it automatically to move to said station by the shortest route and stop thereat.

27. In a control system for a motive means for moving a plurality of load supports in an endless path successively past a station, means for selecting a particular one of said supports and causing said motive means to move it automatically to said station by the shortest route.

28. In a control system for a motive means for moving a plurality of load supports in an endless path successively past a station, means for selecting a particular one of said supports and causing said motive means to automatically move it to said station by the shortest route and stop it thereat.

29. In a conveyor system, the combination with a plurality of load movers movable in an endless path successively past a station, and a motive means for moving said load movers, of a control system for said motive means, said control system including means for selecting a particular one of said load movers, and a selector associated therewith comprising means movable in accordance with the movement of said load movers for automatically and selectively effecting the connection of said motive means to a source of supply, whereby it is actuated to move a selected one of said load movers to the station by the shortest route.

30. In a conveyor system, the combination with a plurality of load movers movable in an endless path successively past a station, and a motive means for moving said load movers, of a control system for said motive means, said control system including means for selecting a particular one of said load movers, and a selector associated therewith comprising means movable in accordance with the movement of said load movers for automatically and selectively effecting the connection of said motive means to a source of supply, whereby it is actuated to move a selected one of said load movers to the station by the shortest route and stop it thereat.

31. In combination, a plurality of load movers movable in an endless path successively past a station, motive means for moving said load movers, means for selecting any load mover and causing said motive means to be actuated selectively to move the load mover selected to the station by the shortest route, said means including an annular member having two arcuate conducting segments disposed in insulated relation to each other and movable in accordance with the movement of the load movers, electroresponsive means connected in circuit relation with one of the arcuate segments and actuable to effect the movement of said motive means in one direction, a second electroresponsive means connected in circuit relation with the other of the arcuate segments and actuable to effect the movement of said motive means in the opposite direction, means operable to select any load mover, and means movable with respect to said arcuate segments and engageable with one or the other thereof depending upon the position of the selected load mover with respect to the station for selectively completing an energizing circuit for each of the said electroresponsive means.

32. In combination a plurality of load movers movable in an endless path successively past a station; motive means for moving said load movers; control means for said motive means including means for selecting any of said load movers and causing said motive means to move the selected receptacle to the station by the shortest route, said means including an annular member having two arcuate conducting segments disposed in insulated relation to each other and movable in accordance with the movement of said receptacles, electroresponsive means connected in circuit relation with one of said arcuate segments and actuable to effect the movement of said motive means in one direction, a second electroresponsive means connected in circuit relation with the other of said arcuate segments and actuable to effect the movement of said motive means in the opposite direction, and a manually operable member movable into a plurality of predetermined positions corresponding each to one of said load movers for selectively engaging one or the other of said arcuate segments depending upon the position of the selected receptacle with respect to the station and for effecting the actuation of the electroresponsive means connected in circuit relation with the segment.

In testimony whereof, I have hereunto subscribed my name this 5th day of October, 1929.

FRANK E. LEWIS.